US008046468B2

(12) United States Patent
Isci et al.

(10) Patent No.: US 8,046,468 B2
(45) Date of Patent: Oct. 25, 2011

(54) PROCESS DEMAND PREDICTION FOR DISTRIBUTED POWER AND RESOURCE MANAGEMENT

(75) Inventors: Canturk Isci, Elmsford, NY (US); Chengwei Wang, Atlanta, GA (US); Chirag Bhatt, Union City, CA (US); Ganesha Shanmuganathan, Union City, CA (US); Anne Holler, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 27 days.

(21) Appl. No.: 12/359,473

(22) Filed: Jan. 26, 2009

(65) Prior Publication Data

US 2010/0191854 A1    Jul. 29, 2010

(51) Int. Cl.
*G06F 15/173* (2006.01)
*G06F 9/46* (2006.01)
(52) U.S. Cl. .................. 709/226; 718/104; 718/105
(58) Field of Classification Search .............. 709/226; 718/104, 105
See application file for complete search history.

(56) References Cited

U.S. PATENT DOCUMENTS

| | | | |
|---|---|---|---|
| 5,579,507 A | 11/1996 | Hosouchi et al. | |
| 6,078,944 A | 6/2000 | Enko et al. | |
| 6,397,242 B1 | 5/2002 | Devine et al. | |
| 6,496,847 B1 | 12/2002 | Bugnion et al. | |
| 6,961,941 B1 | 11/2005 | Nelson et al. | |
| 7,203,944 B1* | 4/2007 | van Rietschote et al. | 718/104 |
| 7,228,441 B2* | 6/2007 | Fung | 713/300 |
| 7,310,684 B2 | 12/2007 | Patrick et al. | |
| 7,346,471 B2* | 3/2008 | Chickering et al. | 702/181 |
| 7,474,992 B2* | 1/2009 | Ariyur | 702/190 |
| 7,577,959 B2 | 8/2009 | Nguyen et al. | |
| 7,673,113 B2 | 3/2010 | Sugumar et al. | |
| 7,698,709 B2* | 4/2010 | Ditlow et al. | 718/104 |
| 7,756,972 B2* | 7/2010 | Ma | 709/224 |
| 2005/0251802 A1* | 11/2005 | Bozek et al. | 718/1 |
| 2007/0204266 A1* | 8/2007 | Beaty et al. | 718/1 |
| 2008/0222633 A1 | 9/2008 | Kami | |
| 2008/0263561 A1* | 10/2008 | Tagashira | 718/104 |
| 2009/0070771 A1* | 3/2009 | Yuyitung et al. | 718/105 |
| 2009/0228589 A1* | 9/2009 | Korupolu | 709/226 |
| 2010/0131959 A1* | 5/2010 | Spiers et al. | 718/105 |

OTHER PUBLICATIONS

Wood et al., Black-box and Gray-box Strategies for Virtual Machine Migration.*
"Detecting Recurrent Phase Behavior Under Real-System Variability" Canturk Isci and Margaret Martonosi, Department of Electrical Engineering, Princeton University, pp. 1-11.

(Continued)

*Primary Examiner* — Joseph Avellino
*Assistant Examiner* — James Conaway

(57) ABSTRACT

Methods and systems for allocating resources in a virtual desktop resource environment are provided. A method includes making a prediction on the future demand for processes running on a distributed environment with several hosts. The prediction is based on the process demand history and includes the removal of historic process demand glitches. Further, the prediction is used to perform a cost and benefit analysis for moving a candidate process from one host to another, and the candidate process is moved to a different host when the cost and benefit analysis recommends such move. In another embodiment, the predictions on future process demand are used for distributed power management by putting hosts in stand-by mode when the overall demand decreases or by adding hosts to the distributed environment when the load increases.

19 Claims, 14 Drawing Sheets

OTHER PUBLICATIONS

Minwen Ji et al., U.S. Appl. No. 11/735,929, filed Apr. 16, 2007, entitled, "Method and System for Determining a Cost-Benefit Metric Potential Virtual Machine Migrations".

Amir et al., "An opportunity cost approach for job assignment in a scalable computing cluster", IEEE Transactions on Parallel and Distributed Systems, vol. 11, No. 7, 2000.

Eager et al., "The Limited Performance Benefits of Migrating Active Processes D for Load Sharing", ACM Sigmetrics, ACM 0-89791-254-3/88/005, pp. 63-72(1988).

Gehring et al., "MARS—A Framework for Minimizing the Job Execution Time in a Metacomputing Environment," Proceedings of Future General ComQuter Systems, pp. 1-18, 1996.

Harchoi-Balter et al., "Exploiting Process Lifetime Distributions for Dynamic Load Balancing", ACM Transactions on ComQuter Systems (TOGS), vol. 15, No. 3, pp. 253-285 (Aug. 1997).

Ryu et al., "Exploiting Fine-Grained Idle Periods in Networks of Workstations", IEEE Transactions on Parallel and Distributed Systems, vol. 11, No. 7, pp. 683-698 (Jul. 2000).

* cited by examiner

PROCESS DEMAND PREDICTION FOR DISTRIBUTED POWER AND RESOURCE MANAGEMENT

CROSS REFERENCE TO RELATED APPLICATIONS

This application is related to U.S. patent application Ser. No. 11/735,929, filed Apr. 16, 2007, and entitled "Method and system for determining a cost-benefit metric for potential virtual machine migrations."

BACKGROUND

1. Field of the Invention

The present invention relates to methods for allocating resources in a virtual desktop environment.

2. Description of the Related Art

The computing industry has seen many advances in recent years, and such advances have produced a multitude of products and services. Computing systems have also seen many changes, including their virtualization. Virtualization of computer resources generally involves the abstraction of computer hardware, which essentially isolates operating systems and applications from underlying hardware. Hardware is therefore shared among multiple operating systems and applications each isolated in corresponding virtual machines. The result of virtualization is that hardware is more efficiently utilized and leveraged, and resource management in a distributed environment like Virtual Desktop Infrastructure (VDI) is becoming a more promising solution. With VDI, users access over a network connection personal desktops provided by virtual machines running on remote servers. Each VM is a complete execution environment, and the server provides a user interface over the network connection so that user inputs and outputs are communicated between the user and the VM. It is desirable to provide a desktop experience to the end-user when using remote services similar to the experience users have when using a traditional system where programs execute locally. The quality of the user experience can vary based on many underlying factors such as round-trip latency or network bandwidth.

A virtual machine executing on a computer system will typically be limited to the resources (such as memory space, CPU cycles, network bandwidth, and so on) of that computer system. The virtual machines executing on a first computer system typically share the resources of the first computer system. The virtual machines executing on a second computer system typically share the resources of the second computer system. The performance of a virtual machine will depend on the resources of the computer system on which the VM is executing, as well as the demands of any other virtual machines executing on the same computer system. This "single" platform represents an undesirable limitation in some situations.

Virtual machines are assigned to computer systems in a manner that balances the loads of the virtual machines among the various computer systems. Processes, such as virtual machines, are known to be balanced based on allocation policies, resource demand, and the availability of resources provided by computer systems. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, some systems implement a "migration" of a running virtual machine (VM) from one system to another.

SUMMARY

A demand predictor identifies the increases in process demands, which are used to sustain optimal performance by proactively performing load balancing and host power-ons. The predictor is also used to forecast long periods of low demand to trigger proactive host power-downs for efficient data center power management. In one embodiment, the predictor is resilient to bursts, referred to herein also as glitches, and provides a representative history model of the process demand characteristics.

In one embodiment, a method for allocating resources in a virtual desktop environment is provided. The method includes the operation of making a prediction for future demand by a plurality of processes running on a first host and a second host. The prediction is based on each process demand history and on removing past process demand glitches. Further, a cost and benefit analysis for moving a candidate process from the plurality of processes from the first host to the second host is performed based on the prediction. Additionally, the candidate process is moved when the cost and benefit analysis recommends the move. In another embodiment, a system including a distributed resource manager performs the method's operations.

In yet another embodiment, a computer program embedded in a computer-readable storage medium, when executed by one or more processors, for distributed power management is presented. The computer program includes program instructions for making a prediction for future demand by a plurality of processes running on a plurality of hosts. The prediction is based on each process demand history and is made after removing past process demand glitches. Further, the computer program includes program instructions for performing a cost and benefit analysis for changing the number of hosts running, and for shutting down a host when the cost and benefit analysis recommends reducing the number of running hosts. Conversely, a stand-by host is started up when the cost and benefit analysis recommends incrementing the number of running hosts.

DETAILED DESCRIPTION

Figure 1:
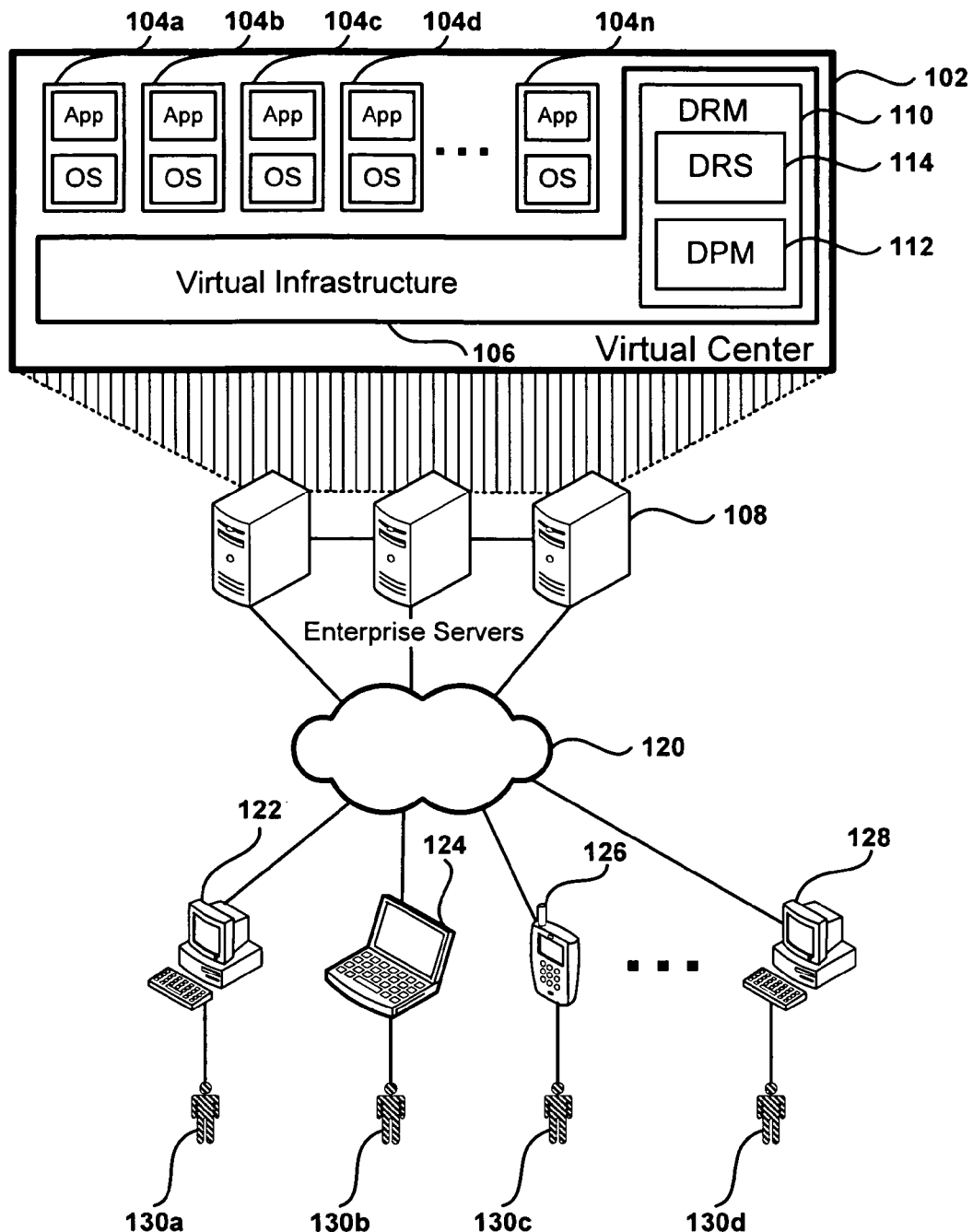
FIG. 1 depicts a remote desktop environment including virtual machine servers, according to one or more embodiments.

FIG. 1 depicts a remote desktop environment including virtual machine servers, according to one embodiment. The environment depicted in FIG. 1 includes enterprise servers 108, also referred to herein as hosts, that provide virtual desktop services to remote users 130a-d. Although embodiments of the present invention are described within a virtual desktop system, the embodiments presented can be used in other environments where several servers are used to support multiple clients which can be serviced by any of the servers. Some embodiments below are described with respect to virtual machines (VM), but the same principles apply to all kinds of processes running on a multi-host environment The architecture of Virtual Center 102 is shown in FIG. 1, with some components omitted for simplification purposes. Virtual Center 102 includes virtual machines 104a-n, and virtual infrastructure 106. Virtual infrastructure 106 manages the assignment of virtual machines (VM) 104a-n to remote users. Each VM includes a Guest Operating System (GOS) supporting applications running on the GOS. Virtual infrastructure layer 106 also includes Distributed Resource Management (DRM) 110 whose purpose is to optimize data center effectiveness in two ways, load balancing and power management.

Distributed Resource Scheduling (DRS) 114 balances load across hosts within a cluster via process migrations. Distributed Power Management (DPM) 112 improves cluster power efficiency by putting hosts into stand-by mode during periods of low resource demand and by reactivating hosts when demand increases. Both DRS 114 and DPM 112 rely on cost-benefit models to decide the best course of action to achieve their respective goals. In one embodiment, the cost analysis for DRS 114 includes the estimation of the resources required to perform a live migration and of the performance degradation the VM may experience during migration. The benefit analysis included the estimation of the performance gain for the VM due to the higher availability of resources in a different host and due to the improved cluster balance. In another embodiment, the costs for DPM include the same costs as with DRS plus the time overhead required for reactivating a standby host in the case of a demand increase. The benefits realized via DPM include the substantial power savings achieved by powering down unneeded hosts during low demand periods. It may often be the case that a migrated VM will slow down other VMs on the destination host at the same time that other VMs on the source host speed up. There is also a risk associated with a migration in that the benefit may not be substantial enough to offset the cost due to subsequent changes in loads.

Remote users 130a-d are connected to computers 122, 124, 126 and 128 acting as clients in the virtual infrastructure. Computers 122, 124, 126 and 128 provide display presentation and input/output capabilities associated with virtual machines 104a-n. Clients include PCs 122 and 128, laptop 124, PDA, mobile phone 126, etc. The clients communicate with enterprise server 108 via network 120.

Embodiments of the invention track resource utilization and demand to evaluate the cost-benefit trade-offs required to effectively perform DRS and DPM.

Figure 2:
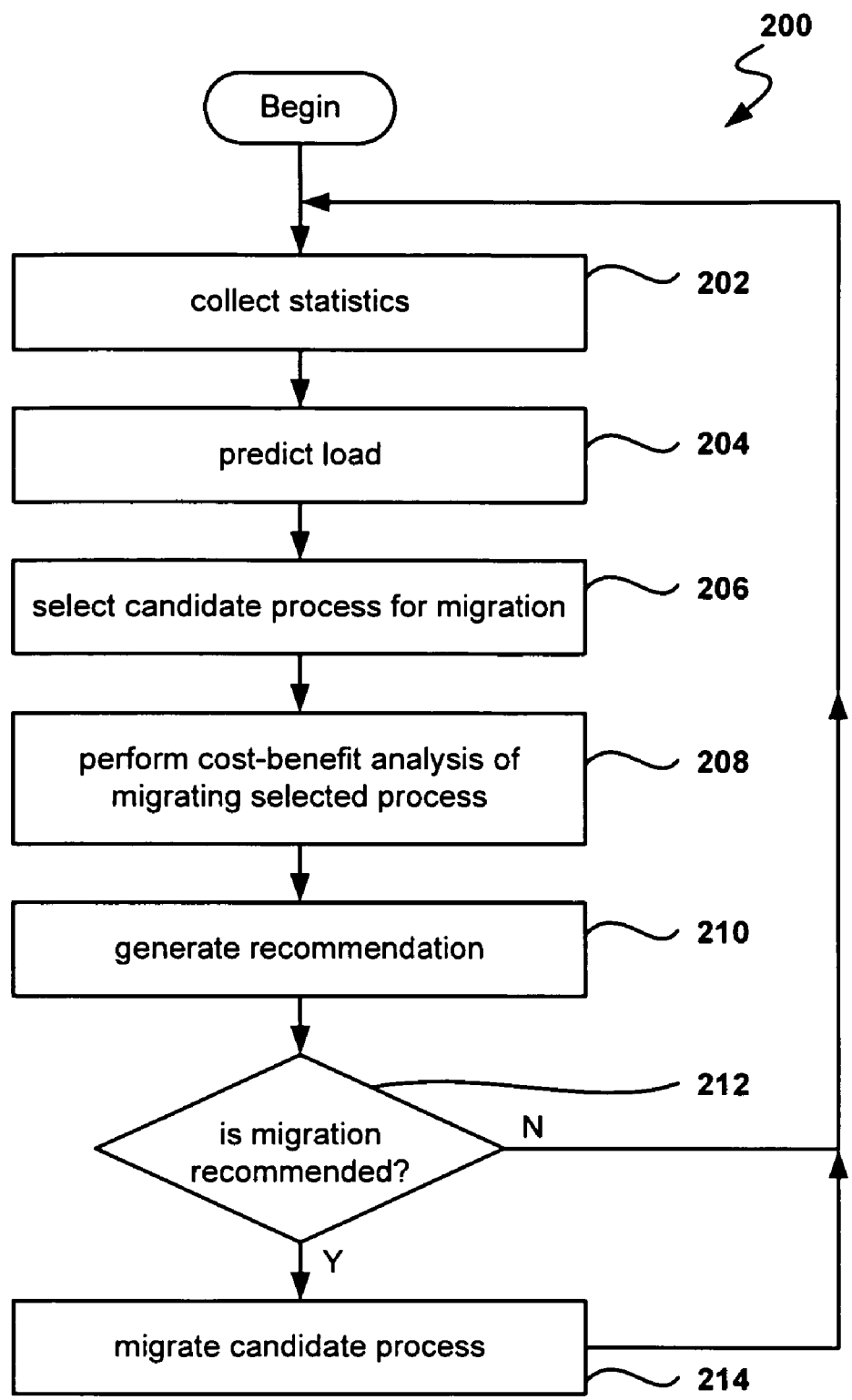
FIG. 2 shows a flow chart for moving one process to a different host, in accordance with one or more embodiments of the invention.

FIG. 2 shows flow chart 200 for moving one process to a different host, according to one embodiment. It should be noted that embodiments of the invention can be based on process "load," "demand," or resource utilization. For simplicity of description, one term or the other may be used for describing embodiments, but similar embodiments are possible by exchanging load for demand or utilization and vice versa. Load balancing is more general than resource utilization balancing. The concept of "load" is more general and may incorporate VM importance. For example, a host load metric may be a "normalized entitlement," which in one embodiment is the sum of all VM resource entitlements divided by the host capacity for that resource. A normalized entitlement may be used because, in some implementations of load balancing, a resource allocation policy specified by a user or a system administrator is taken into account. In such a situation, some VMs are more important than others. Thus, "load" can incorporate both raw resource demand and VM importance or "entitlement." "Load" can be considered to be utilization weighted by importance. If all VMs have equal importance and are actively competing for resources, then "load" equates to "utilization." The present invention takes into account stability of loads as well as migration cost, hence embodiments of the invention can protect a system from thrashing, i.e., migrating VMs frequently without gaining resource availability.

Processes may be balanced based on allocation policies, resource demand, and the availability of resources provided by computer systems. Balancing can be applied to computer resources such as processor time, i.e., CPU cycles, memory space, network bandwidth (including any type of input/output or bus bandwidth), storage space, power consumption, cache space, software licenses, etc. Other examples of resources to which process balancing can be applied will be apparent to one of ordinary skill in the art without departing from the scope of the present invention.

In operation 202, the virtual center infrastructure collects statistics related to process demands for resources, and in operation 204 a load or demand prediction is performed. See below the descriptions in reference to FIGS. 7A-B for more details on predictive methods. A candidate process for migration is selected in operation 206 and a cost-benefit analysis for migrating the candidate is performed subsequently in operation 208. A recommendation is generated based on the cost-benefit analysis in operation 210, and the recommendation is evaluated in operation 212. If the recommendation is to perform a migration, then the method continues into operation 214 where the migration of the candidate process from one host to another takes place. The flow returns to the beginning to continue with the load balancing process, until load balancing activities end causing the method to end (not shown in the flow chart for simplicity).

Typically, migrating a virtual machine from a first computer system to a second computer system includes transferring memory and non-memory state data from a source system to a destination system, halting execution of the VM on the source system, and resuming execution of the VM on the destination system. Migrating virtual machines beneficially facilitates dynamic rebalancing of virtual machines in a cluster. More details on the migration process and the cost-benefit analysis of a migration can be found on U.S. patent application Ser. No. 11/735,929, filed Apr. 16, 2007, and entitled "Method and system for determining a cost-benefit metric for potential virtual machine migrations," which is incorporated herein by reference.

Figure 3:
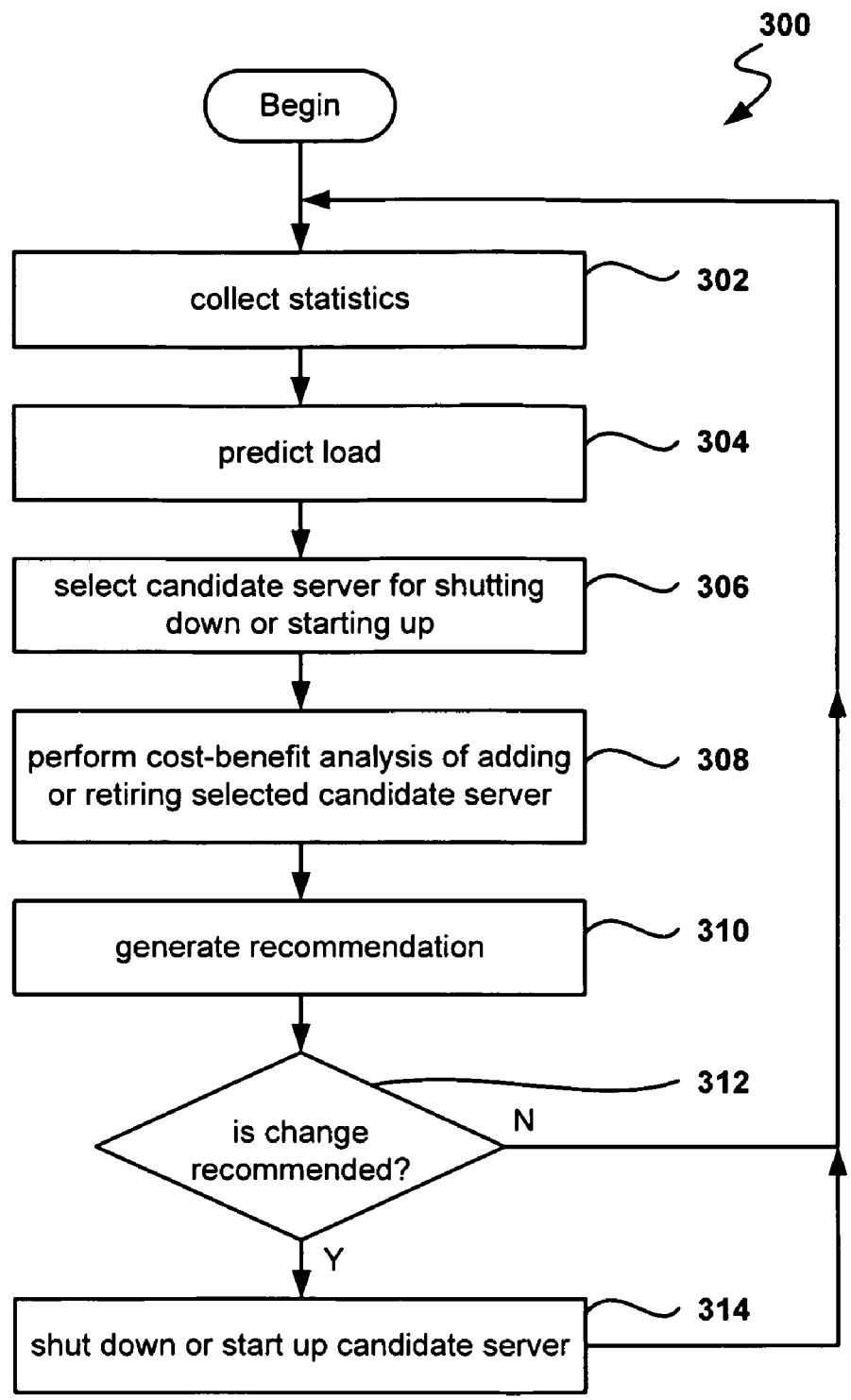
FIG. 3 illustrates a flow chart of an embodiment to dynamically change the number of active hosts in a distributed environment.

FIG. 3 illustrates a flow chart of an embodiment to dynamically change the number of active hosts in a distributed environment. In operations 302 and 304, systems statistics are collected and process load is predicted, respectively. A candidate server for power management is selected in operation 306. A running candidate server can be shut down to save power, or a stand-by candidate server can be started up to improve system performance. In operation 308, a cost-benefit analysis is performed for adding the candidate server to the active pool of servers or for retiring the candidate server from the pool. A recommendation is generated in operation 310 based on the cost-benefit analysis, and the recommendation is checked in operation 312. If the change in the number of running servers is recommended, then the process continues to operation 314, where the candidate process is shut down or started up according to the recommendation. After the change in the number of servers, or if the change is not recommended, the method returns back to the beginning to continue power management operations. The method will end when power management operations terminate (not shown for simplicity).

Figure 4:
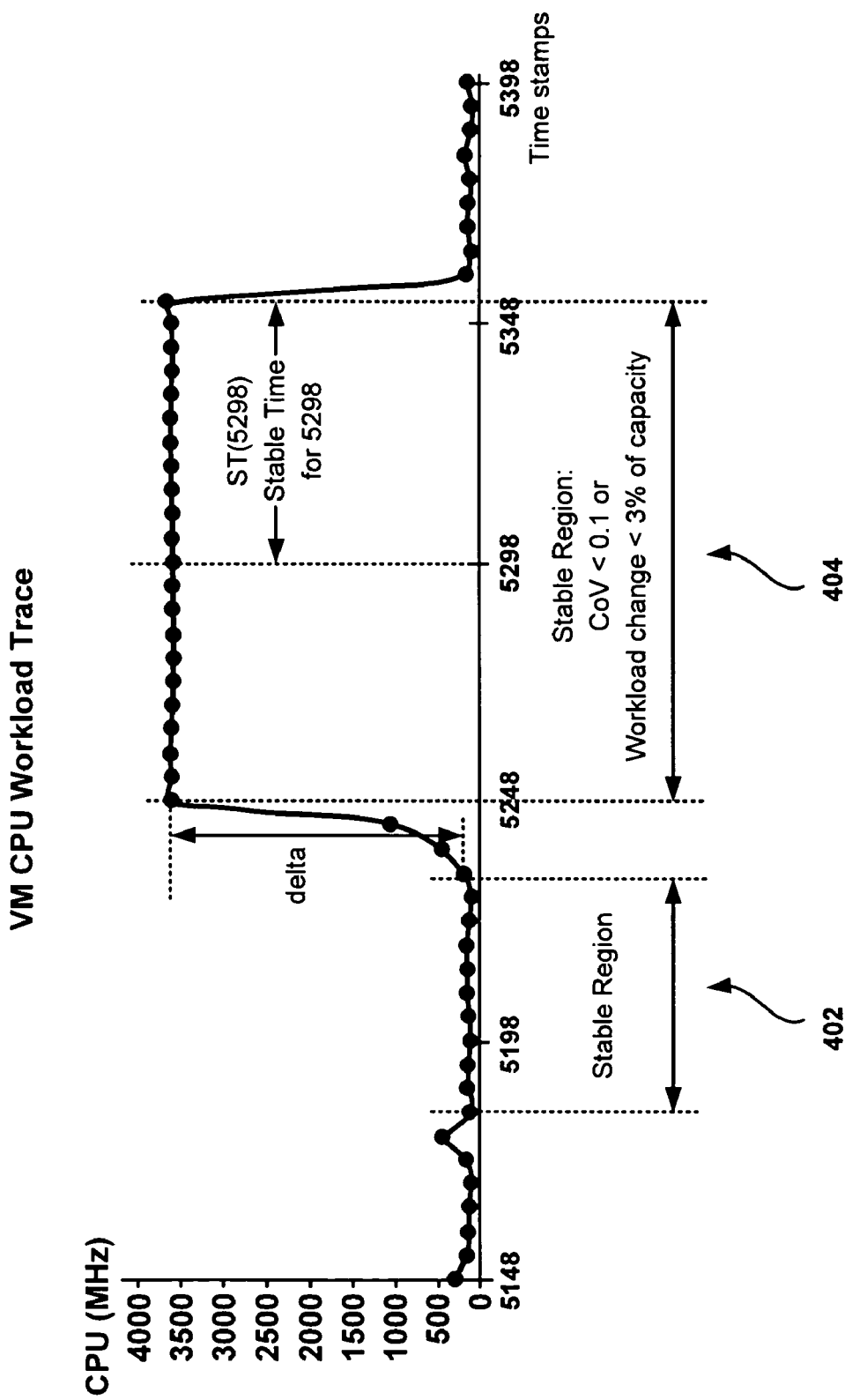
FIG. 4 shows stable regions and delta values between stable regions for a CPU workload trace, according to one or more embodiments.

FIG. 4 shows stable regions and delta values between stable regions for a CPU workload trace, according to one embodiment. The horizontal axis includes timestamps between 5148 and 5398, and the vertical axis includes the CPU workload for the VM. Stable regions 402 and 404 are identified in FIG. 4. A stable demand period is defined as a time-span during which VM demand stays under a defined variation threshold. The threshold can be determined by different methods. In one embodiment, the threshold is calculated based on the coefficient of variance, also called coefficient of variation, which is the standard deviation divided by the mean. In another embodiment, the threshold is a percentage of the cluster total capacity or the server capacity, where cluster refers to all the servers in the pool of servers providing services to clients. For example, the threshold can be set at 3% of cluster capacity, but other values are also possible. By using a standard measurement across all processes, comparing cost-benefit for migrating processes is more accurate as all processes use the same metric.

In one embodiment, when the value of a sample falls outside the threshold then the stable period ends. The system will continue analyzing successive values until a new stable period is identified. To determine the beginning of a new stable period, a number of consecutive samples can be examined and if the samples fall within a band determined by the threshold, then the new stable period begins. The number of consecutive samples required varies in different embodiments. For example, if a value of 1 sample is used, a new stable period will begin each time a sample falls outside the previous threshold band.

Figure 5:
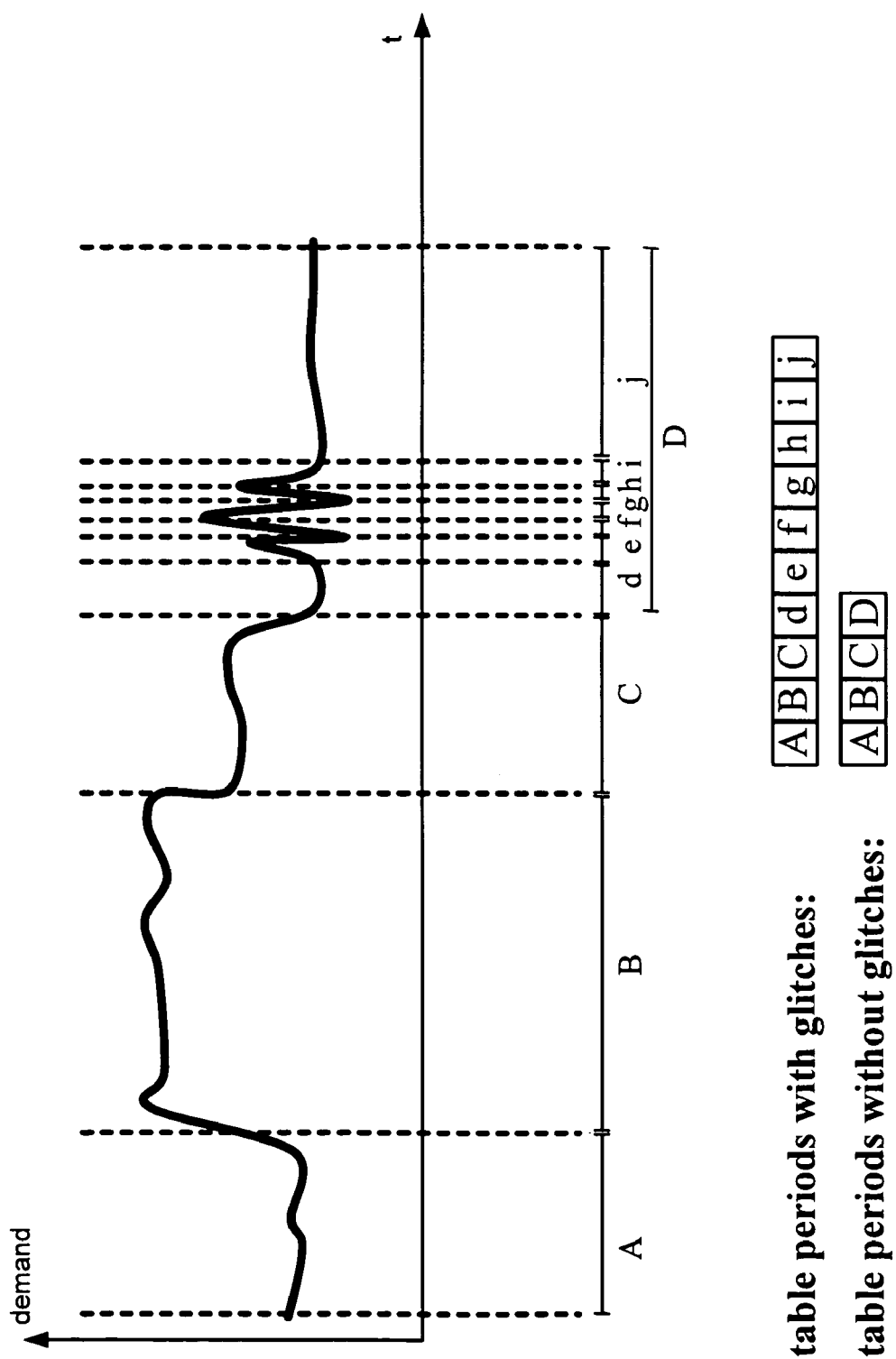
FIG. 5 illustrates an embodiment for removing glitches in the demand history in accordance with one or more embodiments.

FIG. 5 illustrates an embodiment for removing glitches in the demand history. Some Distributed Resource Scheduling (DRS) solutions work in reactive mode to VM demand changes. In one embodiment, the remaining time the current VM demand will be stable is estimated for DRS based on prior and current stable periods. This approach exhibits limitations in cases where the demand shows cyclic patterns or where the demand experiences intermittent bursts.

A sample demand trace is shown in FIG. 5, where short-lived bursts, referred to herein as glitches, may cause history thrashing. A glitch is a fluctuation in the VM historical resource usage trace. Without glitch removal, the system will determine the stable periods as those periods where the demand is within a certain threshold, as previously described. In this case, the demand chart of FIG. 1 will produce stable periods A, B, C, d, e, f, g, h, i, and j.

To eliminate or reduce the effects of glitches in the prediction of future resource demand requests, a glitch detection and removal process is performed. By removing these glitches the predictor acquires more reliable and longer historical information to distinguishes noise from actual change in VM behavior. As a result, the method predicts longer workload stability periods. In one system, measurements indicated stable periods ranging from ten minutes to an hour. By identifying longer stable periods, better long-term predictions are identified, which improves the accuracy of recommendations required for expensive VM migrations and host power management used for DRS and DPM. In addition to predicting stable time, the predictor projects the demand, sometimes referred to as the delta compared to the baseline of the previous stable period, at which the VM workload will run after the end of the stable period. In one embodiment, the delta is calculated using a conservative approach by using the worst-case load over a predetermined amount of time, such as the past 60 minutes, excluding glitches. With glitch removal, the demand chart of FIG. 5 will identify stable periods ABCD, after removing the glitches in period D.

Figure 6A:
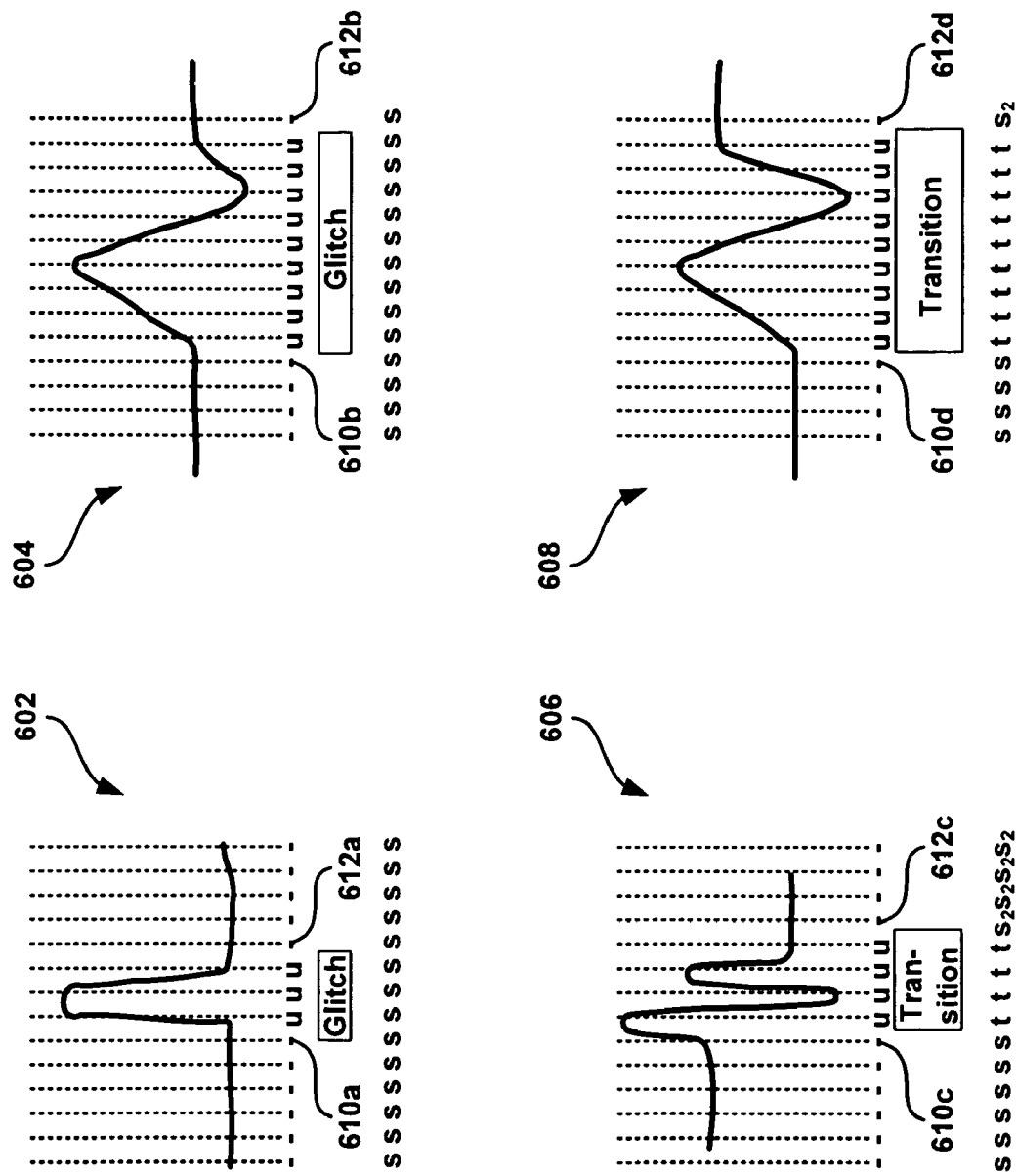
FIG. 6A illustrates details for removing glitches to calculate stable periods, in accordance with one or more embodiments.

FIG. 6A illustrates details for removing glitches to calculate stable periods, in accordance with one embodiment. Glitch removal is performed in two operations. In the first operation, each sample is compared with the previous sample to determine if the sample is a stable sample (represented as a "-" in FIG. 6A) or if the sample is an unstable sample (represented as a "u"). The sample is considered stable if the difference with the previous sample falls within a predetermined threshold $T_a$, otherwise the sample is considered unstable.

In one embodiment, the acceptance threshold metric $T_a$ is based on the global capacity of the cluster or host. This is defined globally in order to normalize load changes across the entire cluster irrespective of demand. In other embodiment, metrics derived from the signal itself, such as coefficient of variation, are used, but they are not transferable across hosts and can show high sensitivity to fluctuations during low demand.

In the second phase, it is determined if unstable samples correspond to a glitch or to a transition to a new stable period. Groups of unstable samples "u" are evaluated together. For each group of u's, the stable sample before the group is compared with the first stable sample following the group. If the comparison determines that the two samples are within the threshold band, then the group of u's is considered a glitch because the workload returns to a value within the stable band. If the comparison determines that the two samples are not within the threshold band, then the group of u's are considered a transition (t) to the next stable period $s_2$. The outcome of the second phase is presented in the bottom line where s stands for stable period, t for transition, and $s_2$ for a second stable period.

Thus in curves 602, and 604 several unstable u samples are identified. The value of samples 610a and 612a corresponding to the samples before and after the group of u's are compared in curve 602, and 610b and 612b in curve 604.

Since the differences between samples 610a-b and 612a-b, respectively, are within threshold $T_a$, the groups of u's are stamped as glitches, which are then removed in the bottom line by re-branding the u samples with an s to indicate that the u samples belong to the stable period. On curves 606 and 608 new stable periods are identified, because the levels after the group of u's do not go back to a similar level before the group. The new stable periods are identified with $s_2$ and the transition samples are branded as t. In different embodiments the group of t's are processed differently. The t's can be added to the preceding stable period, to the following stable period, or be left standing alone as a transition period. It should be appreciated that the embodiments illustrated in FIG. 6A are exemplary methods for eliminating glitches. Other embodiments may utilize different criteria for identifying glitches. The embodiments illustrated in FIG. 6A should therefore not be interpreted to be exclusive or limiting, but rather exemplary or illustrative.

Figure 6B:
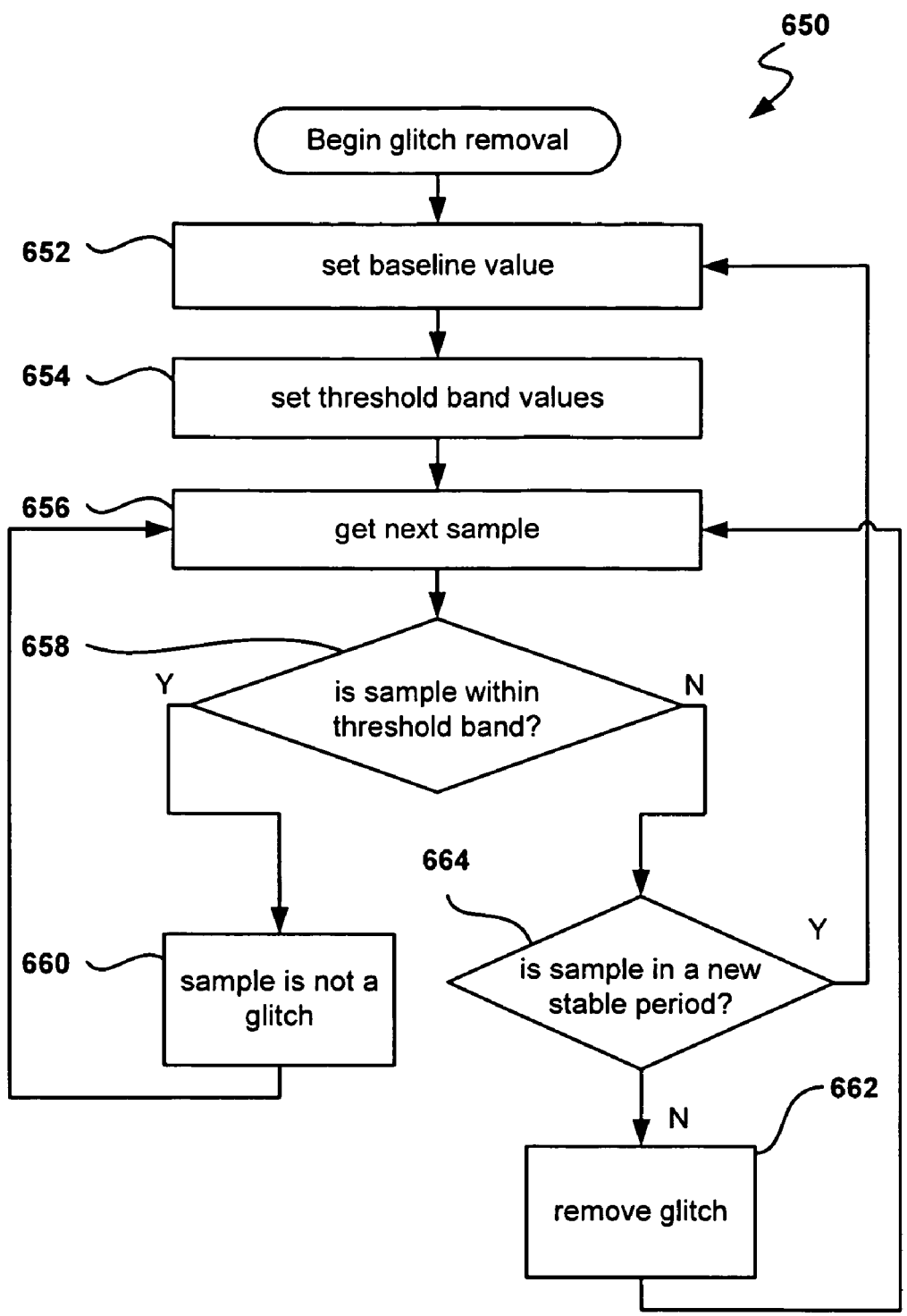
FIG. 6B shows a flow chart of an embodiment to remove glitches.

FIG. 6B shows flow chart 650 of an embodiment to remove glitches, where the determination of whether a given sample is considered within the sable period is based on a baseline value and threshold $T_a$. In operation 652 a baseline value is set. The baseline value can be determined as the value of the first sample in the stable period, an average of samples over a previous period, a worst case sample over a previous period, etc. In operation 654 the threshold $T_a$ is identified, using one of the methods previously described.

The next sample is identified in operation 656, which will be the first sample when the method first reaches operation 656. In operation 658, the method checks whether the sample is within the baseline value $\pm T_a$, that is within the band (baseline$-T_a$, baseline$+T_a$). If the sample is within the band then the sample is not marked as a glitch, or in other words, the sample is marked as "stable" in operation 660. The method flows back to operation 656. If the sample is outside the band, the method flows to operation 664 where the method checks if the sample is the beginning of a new period, and if so, the method flows back to operation 652 and to operation 662 otherwise. In one embodiment, the beginning of a new stable period is determined by examining a number n of samples to see if the n samples are grouped together within a potential new threshold value $T_a'$. The value of n is bigger than 1, because if n is 1, then a new stable period begins every time a sample is found outside the band and there would be no glitch removal. In operation 662 the glitch is removed and the method flows back to operation 656 to continue with the next sample.

Figure 6C:
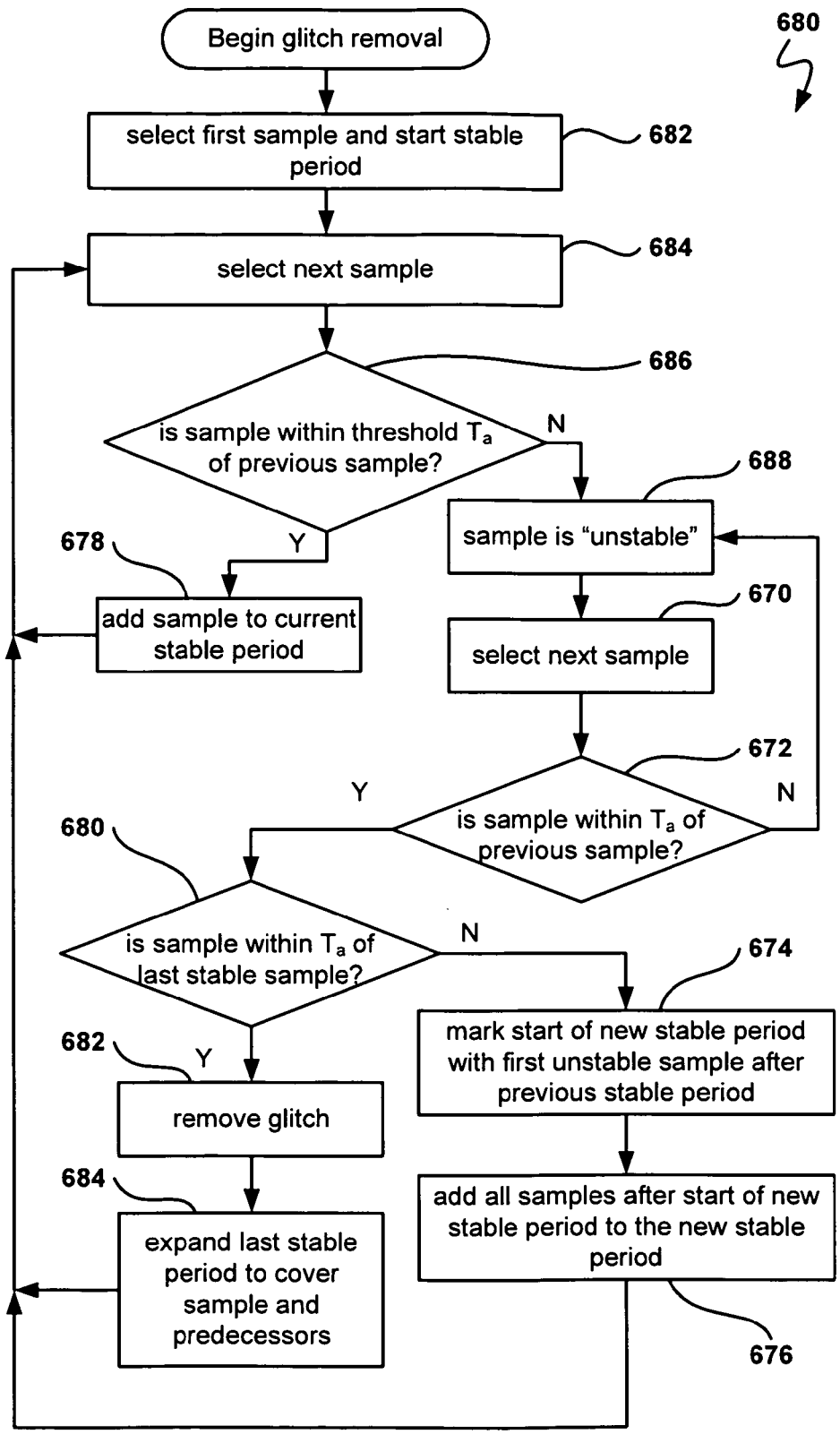
FIG. 6C shows a flow chart for another embodiment to remove glitches based on the difference between a sample and the predecessor.

FIG. 6C shows a second flow chart 680 for another embodiment to remove glitches based on the difference between a sample and the predecessor, as described above in reference to FIG. 6A. In operation 682, the first sample and the start of the stable period are identified. The next sample is selected in operation 684 and the method continues to operation 686, where the sample is compared against the value of the previous sample to see if the samples differ by more than $T_a$. If the sample is within $\pm T_a$ from the previous sample, then the sample is added to the current stable period in operation 678. Otherwise, the sample is marked as "unstable" in operation 688 and the next sample is selected in operation 670. In this section of the flow chart, the method is checking for consecutive unstable samples until a new stable sample is found, at which point the method will determine if the successive unstable periods form a glitch or if the beginning of a new stable period has been identified.

In operation 672 the sample is compared against the previous sample, and if the sample is within $\pm T_a$ then the method continues to operation 680 and back to operation 688 otherwise. When the method reaches operation 680 a new stable sample as been found after a number of consecutive unstable samples. The sample is compared to the last previous stable sample and if the sample is found within $\pm T_a$ of the last stable sample, then the method continues to operation 682 to remove the glitch. Otherwise, the method has identified a new stable period and the flow continues to operation 674, where the start of a new stable period is marked at the time corresponding to the first unstable period from the group identified in operations 688, 670 and 672.

In operation 676, all the samples following the start of the new stable period are added to the new stable period and the method flows to operation 684. In other embodiments, the beginning of the new stable period can be established in a different place in time, such as at the first new stable period, at the last unstable sample, or anywhere else inside the unstable samples. In yet another embodiment, the unstable samples are left outside any of the stable periods, and only stable samples are considered for determining the length of a stable period.

Returning to the left side of flow chart 680, after removing the glitch in operation 682, the stable period is expanded to cover the sample and the preceding samples that were part of the removed glitch in operation 684. The method then flows back to operation 684 of selecting the next sample.

Figure 7A:
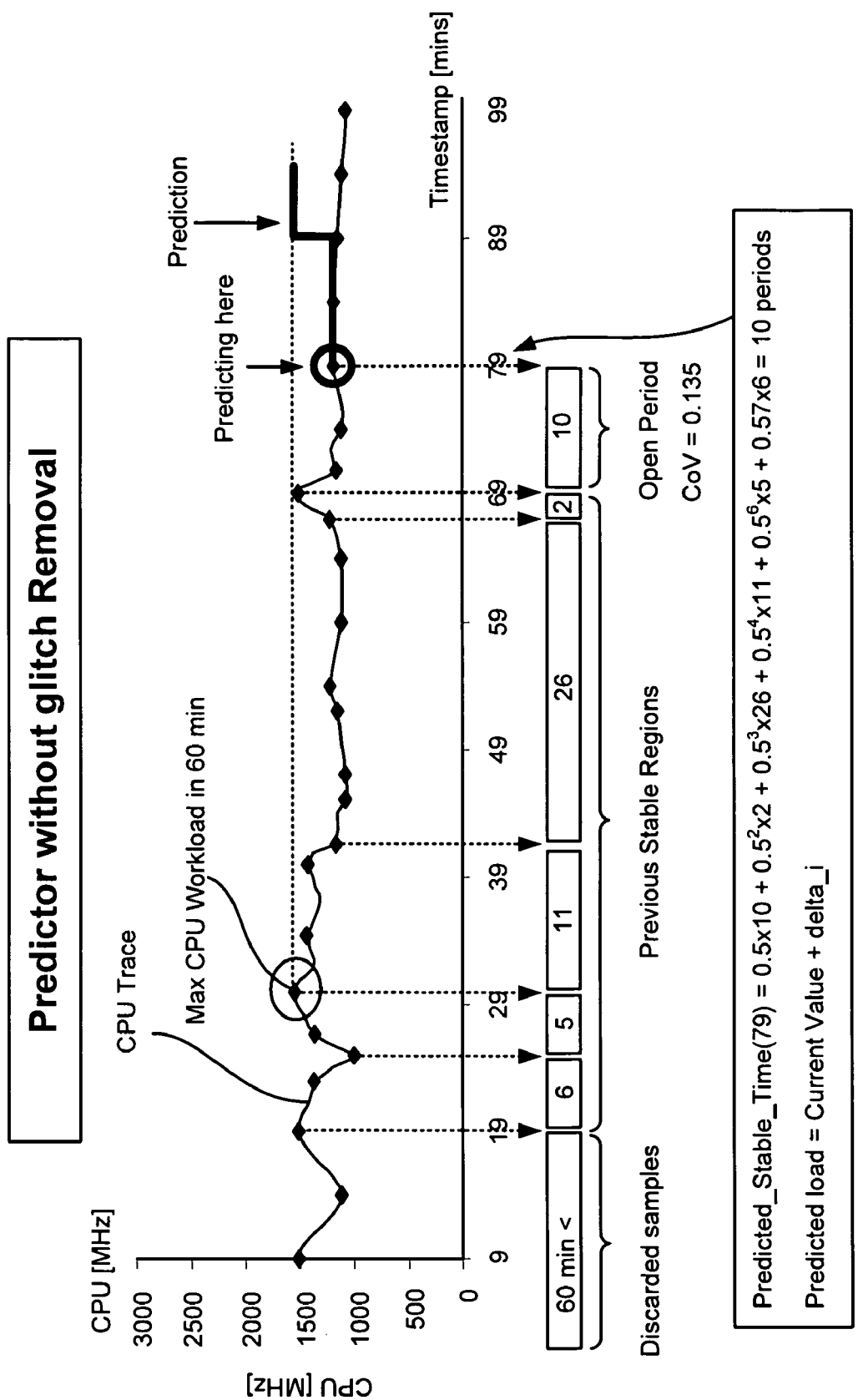
FIGS. 7A-B depict embodiments for performing predictions based on demand history in accordance with one or more embodiments.
Figure 7B:
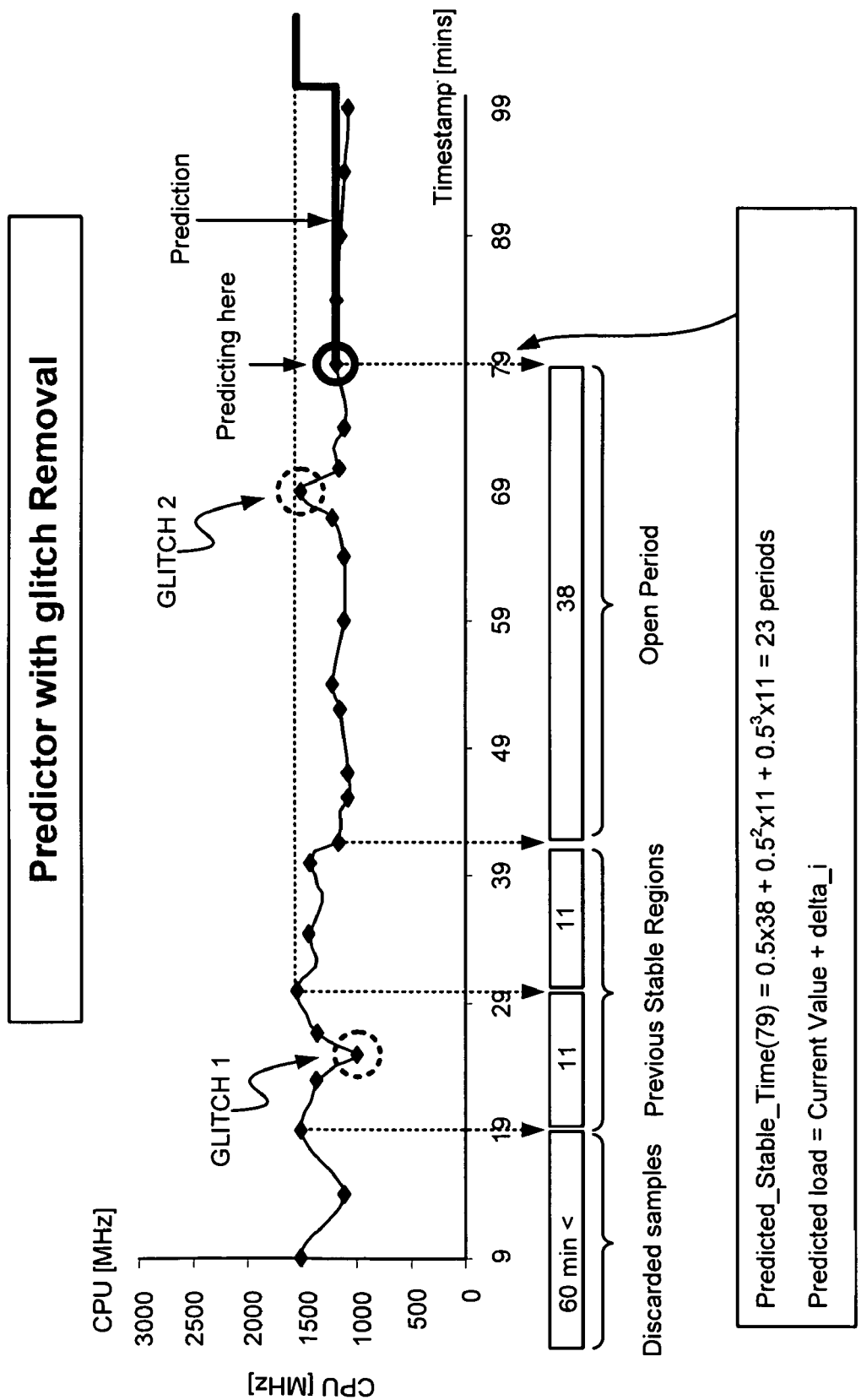

FIGS. 7A-B depict embodiments for performing predictions based on demand history. The horizontal axis corresponds to timestamps in minutes and the vertical axis corresponds to the CPU VM workload. FIG. 7A shows a VM workload trace from minute 9 to 99. A prediction for future workload demand is being made at minute 79. In this embodiment, only the last 60 minutes of data is used for the prediction, but other periods are also possible.

DPM cost-benefit analysis needs to account VM demand for a long future period in order to derive the potential benefit and justify the cost of migrating the VMs to a different host, of powering on or off a host, or reverting prior actions when loads change again in the future. In one embodiment, DRS groups VMs into stable and variable workloads and migrates the VMs accordingly. Beyond DRS, the future VM demand can be used to guide users to command the deployment of more or less resources for the VM, such as with a performance troubleshooting tool.

The workload trace in FIG. 7A shows the stable periods within the 60 minutes preceding the prediction point. The stable periods have durations of 6, 5, 11, 26, 2, and 10 minutes. The predicted stable time is calculated as the exponential weighted average (EWA) of the stable periods. In the example, a factor a 0.5 is used for EWA, but other factors are possible. The result is a predicted stable time of 10 minutes.

Additionally, the predicted load for the predicted stable time is calculated as the worst case workload in the preceding 60 minutes. Thus, the predicted load corresponds to the workload at time 30, which is the highest value from samples between the 19 and 79 minutes.

FIG. 7B presents the same scenario as with FIG. 7A except that glitches are eliminated before making the prediction. The predictor has identified two glitches in the last 60 minutes, Glitch 1 and Glitch 2. After eliminating both glitches, there are three stable periods between minutes 19 and 79 with durations of 11, 11, and 38 minutes. The new predicted stable time is 23 minutes, substantially greater than the 10 minutes predicted without glitch removal.

Figure 8A:
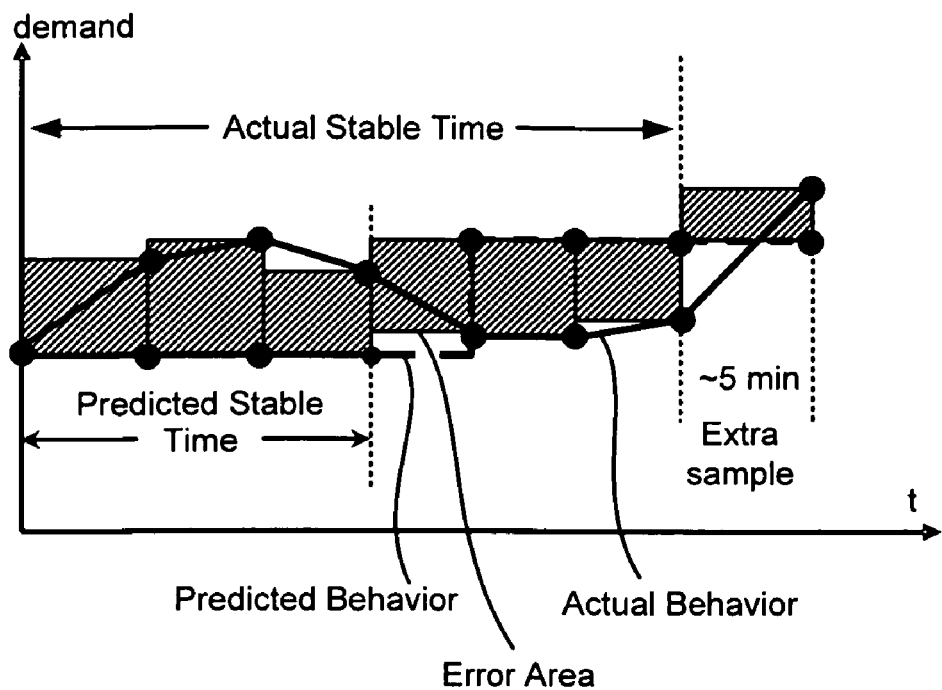
FIGS. 8A-B illustrate embodiments for measuring the error associated with different predictive methods.
Figure 8B:
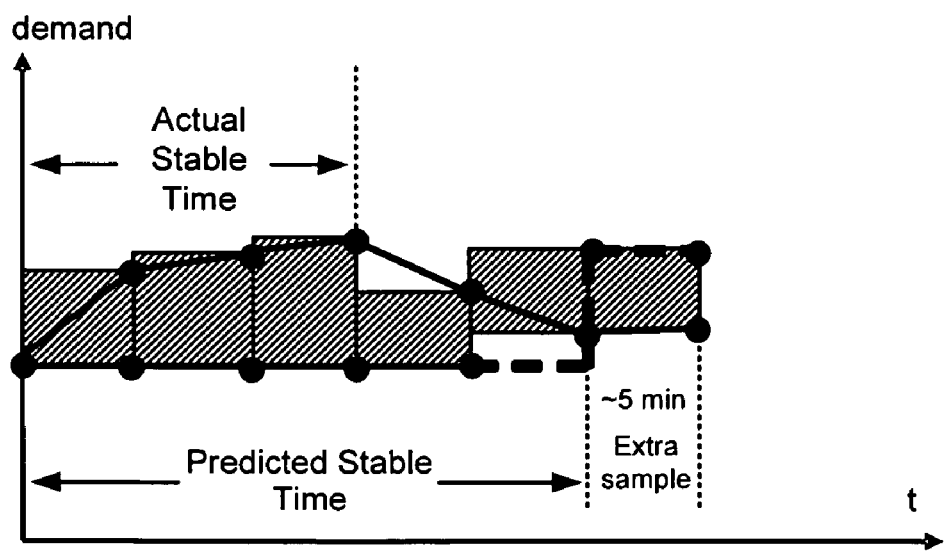

FIGS. 8A-B illustrate embodiments for measuring the error associated with different predictive methods. The prediction accuracy of different predictive methods is measured by adding up a certain amount of error accumulated between sampling times. The error is measured relative to the difference between the actual demand and the predicted pattern vector. In each period, the error is calculated as the area of a rectangle. The base of the rectangle is the duration of the sample period and the height is the absolute value of the difference between the predicted and actual values at the end of the sampling period. This area is normalized for the duration of the pattern. Since the predictor performs both duration and next-demand-level prediction, the area measure is considered for the duration of a predicted or actual stable time, followed by an extra sample period, 5 minutes in this case, in the next predicted demand level.

FIGS. 8A and 8B show this error evaluation method for two possible cases. FIG. 8A shows the error computation for a prediction where predicted stable time is shorter than the actual stable time. FIG. 8B shows the case where the predicted stable time is longer than the actual stable time.

Figure 9:
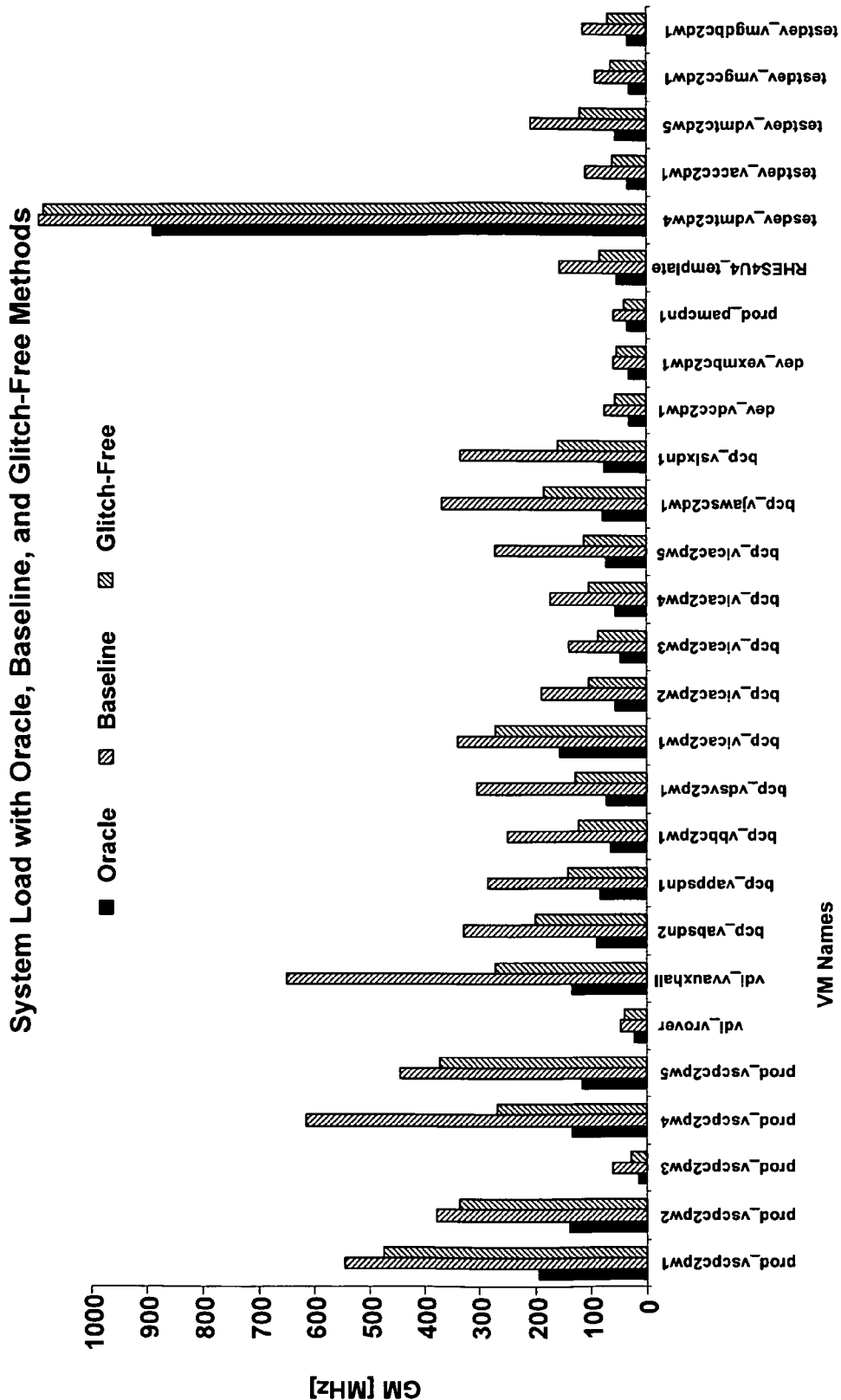
FIG. 9 illustrates a measurement of the relative performance of different predictive methods in accordance with one or more embodiments.

FIG. 9 illustrates a measurement of the relative performance of different predictive methods. Three predictive methods are compared in the FIG. 9: a post-facto prediction method called Oracle, a baseline method that does not remove glitches, and a glitch-free method. The Oracle name refers to the all knowing Oracle because it uses actual performance data and represents the lower predictive error possible.

As seen in FIG. 9, the Oracle method had the lowest error for all the VMs used in the assessment. Second was the glitch-free method and worst was the baseline method.

Figure 10:
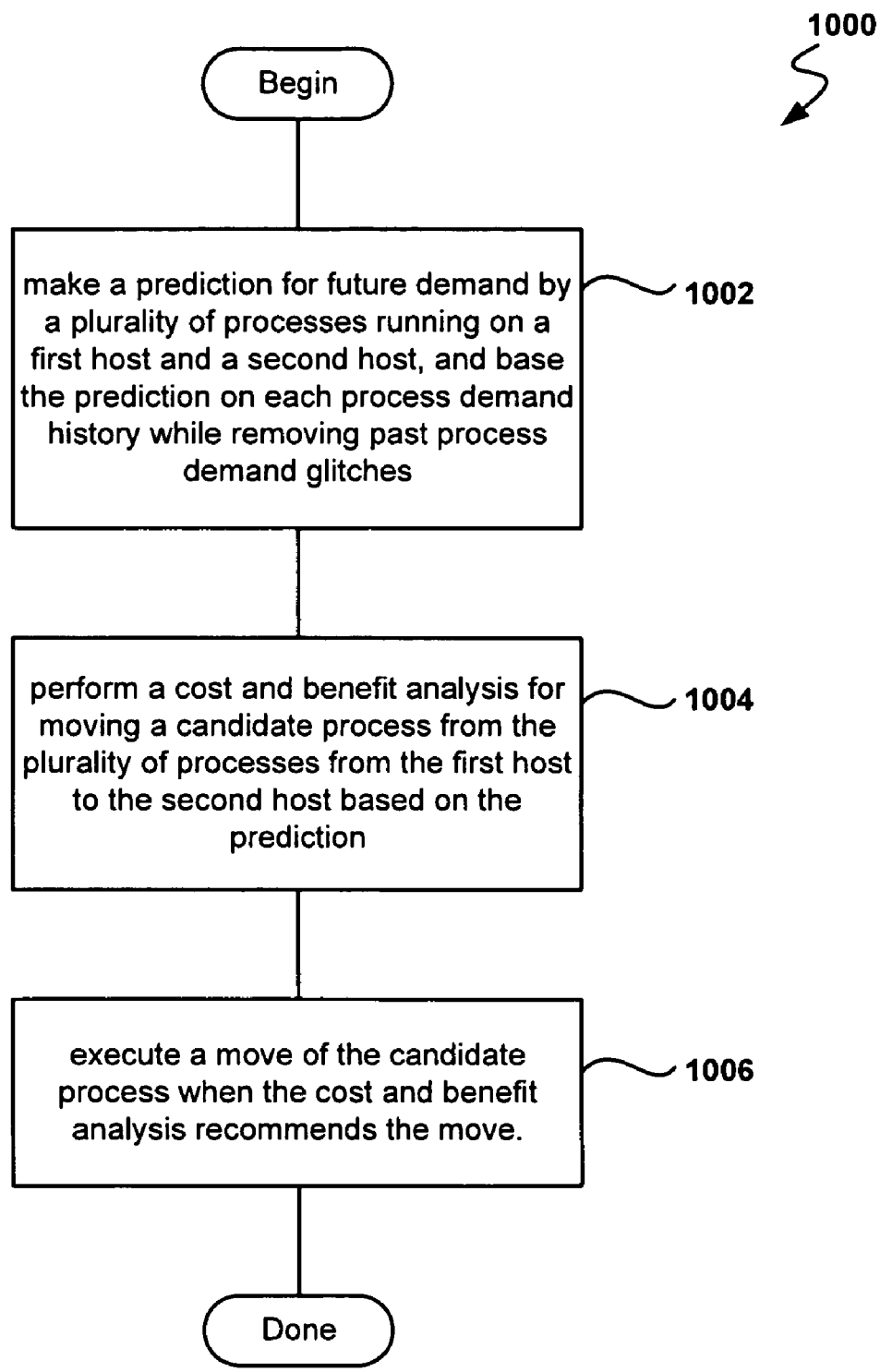
FIG. 10 shows the process flow for allocating resources in a virtual desktop environment in accordance with one or more embodiments of the invention.

FIG. 10 shows process flow 1000 for allocating resources in a virtual desktop environment in accordance with one embodiment of the invention. A desktop includes a graphical interface that enables human interaction with a computer. Term "virtual desktop environment" as described herein means a system having distributed resources for providing desktop services to end users. In operation 1002, a prediction for future demand by a plurality of processes running on a first host and a second host is made. The prediction is based on each process demand history and on removing past process demand glitches. In operation 1004, the method includes performing a cost and benefit analysis for moving a candidate process from the plurality of processes from the first host to the second host based on the prediction. In operation 1006, the candidate process is moved when the cost and benefit analysis recommends this course of action.

Figure 11:
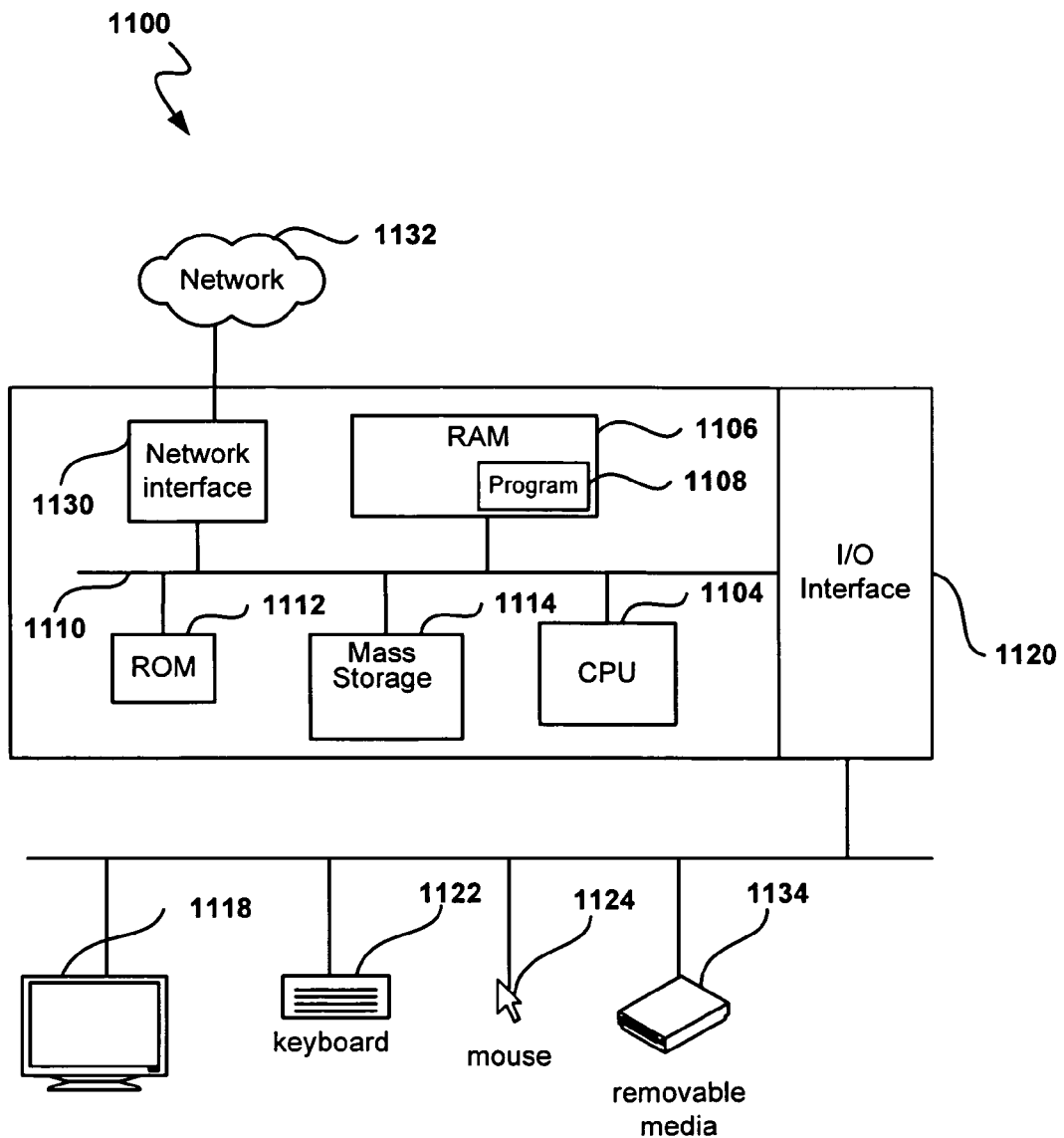
FIG. 11 is a simplified schematic diagram of a computer system for implementing embodiments of the present invention.

FIG. 11 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 1104, which is coupled through bus 1110 to random access memory (RAM) 1106, read-only memory (ROM) 1112, and mass storage device 1114. Program 1108 resides in random access memory (RAM) 1106, but can also reside in mass storage 1114. Program 1108 can include Distributed Resource Management, Distributed Resource Scheduling, Distributed Power Management (DPM), and other programs used to implement embodiments of the invention. Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein, such as remote desktop view 130 from FIG. 2. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for allocating resources in a virtual desktop environment, the method comprising:
   making a prediction for future demand by a plurality of processes running on a first host and a second host, the prediction being based on each process demand history and on removing past process demand glitches, including defining the process demand history on which the prediction is based by identifying any past process demand glitch and by including stable periods while excluding any identified past process demand glitch between the stable periods;
   selecting a candidate process for movement, the candidate process being one of the plurality of processes;
   performing a cost and benefit analysis for moving the candidate process from the plurality of processes from the first host to the second host based on the prediction, the cost and benefit analysis being specific to the candidate process; and
   executing a move of the candidate process when the cost and benefit analysis recommends the move;
   wherein removing past process demand glitches further includes,
   finding a glitch in process demand as an unstable period between first and second stable periods, including identifying the glitch by comparing adjacent samples of process demands to identify unstable samples and then grouping the unstable samples for determining whether a group of the unstable samples is a glitch, and
   removing the glitch in process demand when a load of the second stable period is within a demand variation threshold from a load of the first stable period, such that the prediction is based on a combination of the first and second stable periods after removal of the glitch.

2. The method as recited in claim 1, wherein making a prediction further includes,
   determining the stable periods in the process demand history, a stable period being a time span during which a demand of the corresponding process stays under a demand variation threshold.

3. The method as recited in claim 2, wherein the demand variation threshold is a predetermined percentage of the sum load capacity of the first host and the second host.

4. The method as recited in claim 2, wherein the demand variation threshold is based on the coefficient of variance of the corresponding process demand history.

5. The method as recited in claim 1, wherein the plurality of processes are a plurality of virtual machines.

6. The method as recited in claim 1 further including,
   performing a power cost and benefit analysis for putting the first host in stand-by mode, and
   moving processes running in the first host to other hosts and putting the first host in stand-by mode when the cost and benefit analysis recommends putting the first host in stand-by mode.

7. The method as recited in claim 1 further including,
   performing a power cost and benefit analysis for starting up a third host, and
   starting up the third host and moving processes from at least one of the first host and the second host to the third host when the power cost and benefit analysis recommends starting up the third host.

8. A virtual desktop resource allocation system, the system comprising:
   a plurality of hosts in a virtual center;
   a process running in a first host from the plurality of hosts; and
   a distributed resource manager in the virtual center, wherein the distributed resource manager,
   predicts a future demand for the process based on an extended history of process demand and on removing past process demand glitches from determinations of the process demand in order to define the extended history, including defining the process demand history on which the prediction is based by including stable periods while excluding any identified past process demand glitch between the stable periods;
   performs a cost and benefit analysis for moving the process to a second host from the plurality of hosts based on the prediction, and
   moves the process to the second host when the cost and benefit analysis recommends the move
   wherein removing past process demand glitches further includes,
   finding a glitch in process demand as an unstable period between first and second stable periods, including identifying the glitch by comparing adjacent samples of process demands to identify unstable samples and then grouping the unstable samples for determining whether a group of the unstable samples is a glitch, and
   removing the glitch in process demand when a load of the second stable period is within a demand variation threshold from a load of the first stable period, such that the prediction is based on a combination of the first and second stable periods after removal of the glitch.

9. The system as recited in claim 8, wherein the prediction includes a time span for a future stable load period and a future change in the demand at the end of the future stable load period.

10. The system as recited in claim 9, wherein the future stable load period is calculated as an exponential weighted average of durations of previous stable load periods within a predetermined amount of time.

11. The system as recited in claim 9, wherein the future change in the demand is a maximum change in demand throughout the predetermined amount of time.

12. The system as recited in claim 11, wherein the predetermined amount of time is 60 minutes.

13. The system as recited in claim 9, wherein moving the process to the second host further includes,
   copying the memory used by the process from the first host to the second host,
   copying the processor state from the first host to the second host, and running the process in the second host and stop the process in the first host.

14. A computer program embedded in a non-transitory computer-readable medium, when executed by one or more processors, for distributed power management, the computer program comprising:
    program instructions for making a prediction for future demand by a plurality of processes running on a plurality of hosts, the prediction being based on each process demand history and on removing past process demand glitches, the process demand history being over a period of time that includes at least one stable period and that excludes any past process demand glitches that are identified as being between two stable periods which are included for making the prediction;
    program instructions for performing a first cost and benefit analysis for changing a number of hosts running;
    program instructions for shutting down a host when the first cost and benefit analysis recommends reducing a number of running hosts; and
    program instructions for starting up a stand-by host when the first cost and benefit analysis recommends incrementing the number of running hosts
    wherein removing past process demand glitches further includes,
    finding a glitch in process demand as an unstable period between first and second stable periods, including identifying the glitch by comparing adjacent samples of process demands to identify unstable samples and then grouping the unstable samples for determining whether a group of the unstable samples is a glitch, and
    removing the glitch in process demand when a load of the second stable period is within a demand variation threshold from a load of the first stable period, such that the prediction is based on a combination of the first and second stable periods after removal of the glitch.

15. The computer program as recited in claim 14, wherein the demand corresponds to Central Processing Unit (CPU) demand.

16. The computer program as recited in claim 14, wherein the demand corresponds to memory usage demand.

17. The computer program as recited in claim 14, further including,
    program instructions for performing a second cost and benefit analysis based on a second demand for a second resource type,
    program instructions for performing an overall cost and benefit analysis as a function of the first and second cost and benefit analysis, and
    program instructions for recommending shutting down or starting up a host based on the overall cost and benefit analysis.

18. The computer program as recited in claim 14, further including,
    program instructions for measuring a first error associated with the prediction, and
    program instructions for measuring a second error associated with a post-event prediction based on actual demand, and
    program instructions for rating the prediction by comparing the first and the second error.

19. The computer program as recited in claim 14, wherein the program instructions for removing past process demand glitches further includes,
    program instructions for finding a glitch in process demand as an unstable period between a first and a second stable periods, and
    program instructions for removing the glitch in process demand when a load of the second stable period is within a demand variation threshold from a load of the first stable period.

* * * * *